United States Patent

[11] 3,610,366

[72] Inventor Seymour Goldberg
   Lexington, Mass.
[21] Appl. No. 813,625
[22] Filed Apr. 4, 1969
[45] Patented Oct. 5, 1971
[73] Assignee EG&G, Inc.
   Bedford, Mass.

[54] SYSTEM FOR MARINE SEISMIC EXPLORATION
   27 Claims, 11 Drawing Figs.
[52] U.S. Cl. .................................................... 181/0.5,
   116/137, 340/7, 340/8, 340/17
[51] Int. Cl. .................................................... G01v 1/00
[50] Field of Search .......................................... 116/137 R,
   137 A; 340/7, 8; 181/0.5, 0.5 H

[56] References Cited
UNITED STATES PATENTS
3,277,437  10/1966  Bouyoucos .................. 340/12

Primary Examiner—Rodney D. Bennett, Jr.
Assistant Examiner—H. A. Birmiel
Attorneys—Ralph L. Cadwallader and Finnegan, Henderson & Farabow ABSTRACT: A system of marine seismic exploration is provided utilizing the force exerted by the ambient pressure of the water to accelerate a piston inwardly toward the closed end of a partially evacuated cylinder, followed by the controlled rebound of the piston due to the compression of the gas contained in the cylinder, to produce acoustic pulses.

INVENTOR
SEYMOUR GOLDBERG
Finnegan, Henderson & Farabow
and
Ralph L. Cadwallader
ATTORNEYS INVENTOR
SEYMOUR GOLDBERG
Finnegan, Henderson & Farabow
and
Ralph L. Cadwallader
ATTORNEYS

SYSTEM FOR MARINE SEISMIC EXPLORATION

This invention relates to acoustic pulse generators and more particularly to acoustic pulse generators for use in marine seismic exploration.

In the exploration of structures laying below bodies of water, it is desirable to generate seismic signals, as an acoustic signal, in the water. The signal then travels through the water into the subsurface structures therebelow. Each interface of the subsurface structure reflects back seismic signals which are then detected and monitored in suitable transducers.

This type of marine geophysical exploration is desirably accomplished from a moving boat which is adapted to traverse a predetermined course so that the exploration can be carried out continuously and uniformly over the entire area.

In the past many devices and procedures have been used for generating the sound sources. These include: explosive charges, exploding gas, electrodes which produce electrical arcs, implosion type devices, and piston type devices.

It has been learned that only the very low frequency content of the seismic sound pulse is useful for deep exploration work. Typically, the useful frequency range lies between 10 and 60 hertz.

Substantial gains in system efficiency are thus obtainable if a seismic sound source can be devised that efficiently generates acoustic energy in this frequency range. Where pulse type systems are used, pulse widths of 10 to 20 milliseconds are required compared to the durations of 1 millisecond or less commonly developed by present pulse systems.

Basically, the present invention utilizes ambient water pressure to accelerate a piston inwardly toward a closed end of a partially evacuated cylinder, followed by the controlled rebound of the piston due to the compression of the gas contained in the cylinder.

The rebound of the piston produces a positive pressure pulse of large magnitude having a relatively long duration and a relatively low frequency. The rarefaction or negative pressure wave generated during the initial acceleration is quite small in amplitude, compared to the magnitude of the positive pressure pulse generated during the rebound.

The exact pulse length of the positive pressure pulse and the exact portion of the piston kinetic energy which is converted to acoustic energy are controlled by the ratio of the initial vacuum pressure within the cylinder to the ambient water pressure, the ambient water pressure itself, the bore of the cylinder, and the stroke of the piston.

Additional advantages of this invention will be set forth in part in the description which follows and in part will be obvious from the description, or may be learned by practice of the invention.

In accordance with the present invention, an acoustic pulse generator for creating acoustic pulses when submerged in a fluid medium comprises an expandable and collapsible structure for establishing a chamber of variable volume in the fluid medium, means connected to the structure for displacing the structure to an expanded position to expand the chamber against the ambient pressure of the fluid medium, and resilient means in the chamber for preventing the chamber from complete collapse when the structure is collapsed by the ambient pressure of the fluid medium and for causing the structure to rebound outwardly with respect to the chamber to produce an acoustical pressure pulse in the fluid medium surrounding the structure.

To achieve its objects and in accordance with its purpose, this invention also provides means which as embodied and broadly described, comprise: a cylinder having one end closed and one end open to a fluid medium, a piston slidably disposed within and in sealing engagement with the cylinder to provide a chamber of variable volume between the closed end of the cylinder and the piston, means for displacing the piston and the closed end of the cylinder to an extended position spaced relative to each other, and resilient means in the chamber for preventing the piston from contacting the closed end of the cylinder when the piston or the closed end of the cylinder, or both are accelerated inwardly with respect to the chamber, by the ambient pressure of the fluid medium and for causing the piston or cylinder, or both to rebound outwardly with respect to the chamber to produce an acoustic pressure pulse in the fluid medium surrounding the cylinder.

Preferably, the resilient means is a relatively compressible fluid such as air. It is also preferred that the displacing means act to hold the piston and the cylinder in the extended position against the pressure of the fluid medium and that the generator include releasing means for releasing the piston and the cylinder from the extended position and permitting the pressure of the fluid medium to drive the piston or the cylinder, or both inwardly with respect to the chamber.

The present invention contemplates a method of producing an acoustic pulse in a fluid medium comprising the steps of establishing a chamber of variable volume in the fluid medium containing a compressible fluid, expanding the chamber against the ambient pressure of the fluid medium to reduce the pressure of the compressible fluid to a vacuum pressure below the ambient pressure of the fluid medium, permitting the ambient pressure of the fluid medium to collapse the chamber to compress the compressible fluid in the chamber, the volume of compressible fluid being sufficient to prevent the chamber from complete collapse and permitting the compressible fluid to cause the chamber to rebound against the ambient pressure of the fluid medium to produce an acoustic pulse in the fluid medium.

The present invention may also be described as a method for marine seismic exploration including the steps of: submerging, in a body of water, a cylinder having an open end and a closed end with a piston disposed between the ends; drawing the cylinder along a predetermined path overlaying the object to be explored; periodically establishing a predetermined volume of gas, at a pressure below the ambient pressure of the water, adjacent the closed end of the cylinder; permitting the ambient water pressure to accelerate the piston inwardly toward the gas to compress the gas adjacent the closed end of the cylinder, with the volume of gas being sufficient to prevent the piston from striking the closed end of the cylinder, permitting the compressed gas to cause the piston to rebound against the ambient pressure of the water to produce a large acoustic pressure pulse; and monitoring the sequence of acoustical signals reflected from the object.

It should be noted that three modes of operation are possible, and each mode is intended to be covered by the description and claims. The three modes are as follows:

1. Where the combined mass of the cylinder and the effective water load mass coupled to the cylinder is substantially equivalent to the combined mass of the piston and the effective water load mass coupled to the piston, so that both the cylinder and the piston move with respect to each other when the generator is fired.
2. Where the combined mass of the cylinder and the effective water load mass coupled to the cylinder is made high, relative to the combined mass of the piston and the effective water load mass coupled to the piston, so that the cylinder is stationary with respect to the piston and the piston moves when the generator is fired.
3. Where the combined mass of the piston and the effective water load mass coupled to the piston is made high, relative to the combined mass of the cylinder and the effective water load mass coupled to the cylinder, so that the piston is stationary with respect to the cylinder and the cylinder moves when the generator is fired.

The effective water load mass is approximated by the following formula:

$8/3 r R^3$ $r$ = the density of the water
$R$ = the radius of the cylinder on the piston It is presently believed that mode 3 is best for systems in which the ratio of the cylinder bore to the stroke length of the piston is small; mode 2 is best for large bore to stroke ratios; and mode 1 is best for the middle bore to stroke ratios which are neither large nor small.

As will be apparent to those skilled in the art, where both the cylinder and the piston move both will rebound causing the large positive acoustic pressure, where the cylinder only moves, it will rebound causing the large positive acoustic pressure, and where the piston only moves, it will cause the large positive acoustic pressure.

Thus, when reference is made to acceleration of the piston toward the closed end of the cylinder, it is intended that there be relative acceleration but that either the piston or the closed end of the cylinder, or both may move. Similarly, references to the means for displacing the piston and the closed end of the cylinder to an extended position spaced from each other, are intended to refer to means which move either the piston, or the cylinder, or both.

For ease of understanding, it will be assumed, in the detailed description of this invention, that the piston moves and the cylinder is stationary with respect to the piston.

The invention consists of the novel methods, parts, constructions, arrangements, combinations, and improvements shown and described.

The accompanying drawings, which are incorporated in and constitute a part of this specification, illustrate certain specific embodiments of the invention, and together with the description, serve to explain the principles of the invention.

It is to be understood that the drawings and the following detailed description are merely exemplary and are not intended to restrict the invention in any way.

Figure 1:
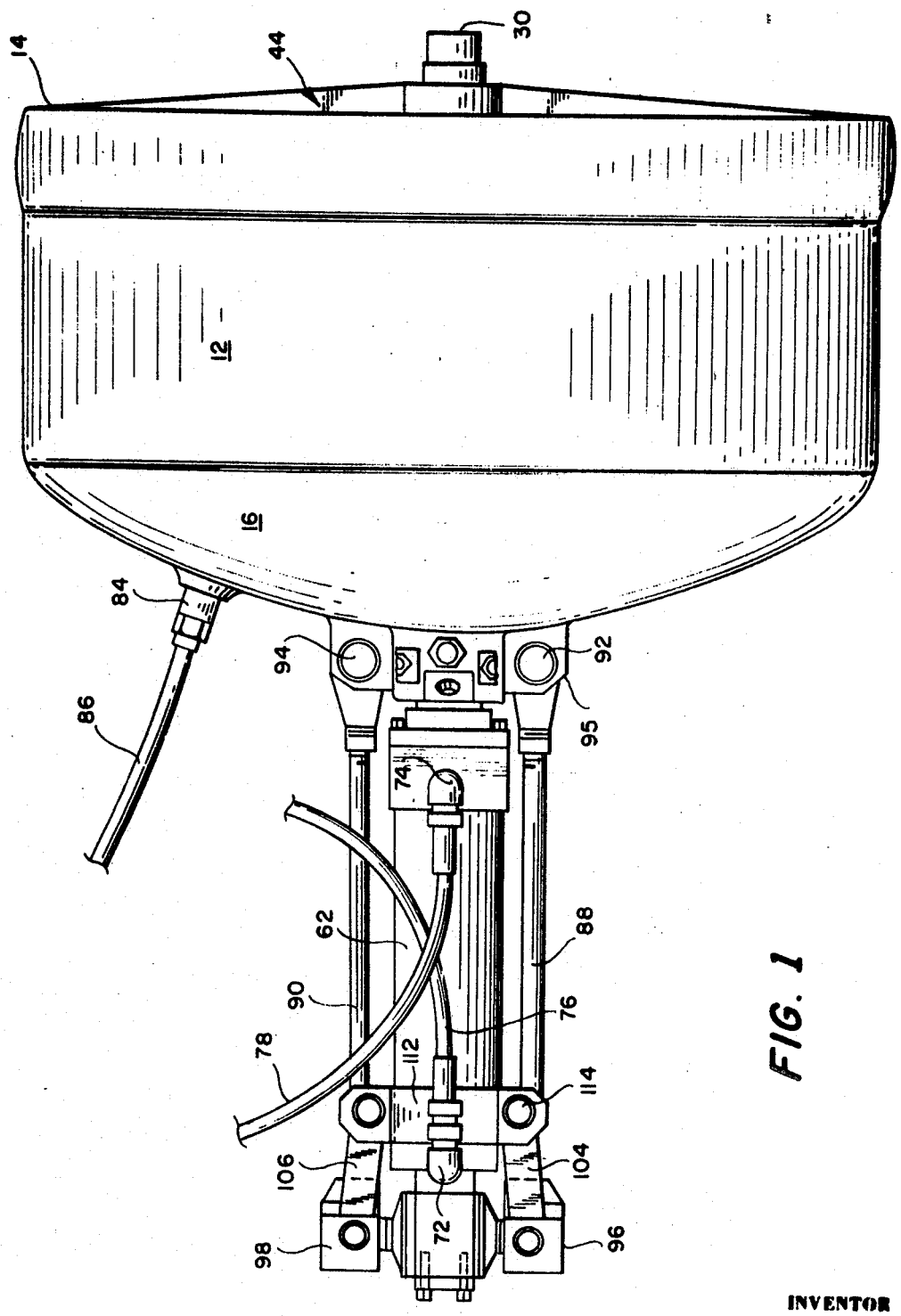
FIG. 1 is a plan view of one embodiment of the acoustic pulse generator of this invention.

Reference will now be made in detail to the present preferred embodiments of the invention, examples of which are illustrated in the drawings.

Figure 2:
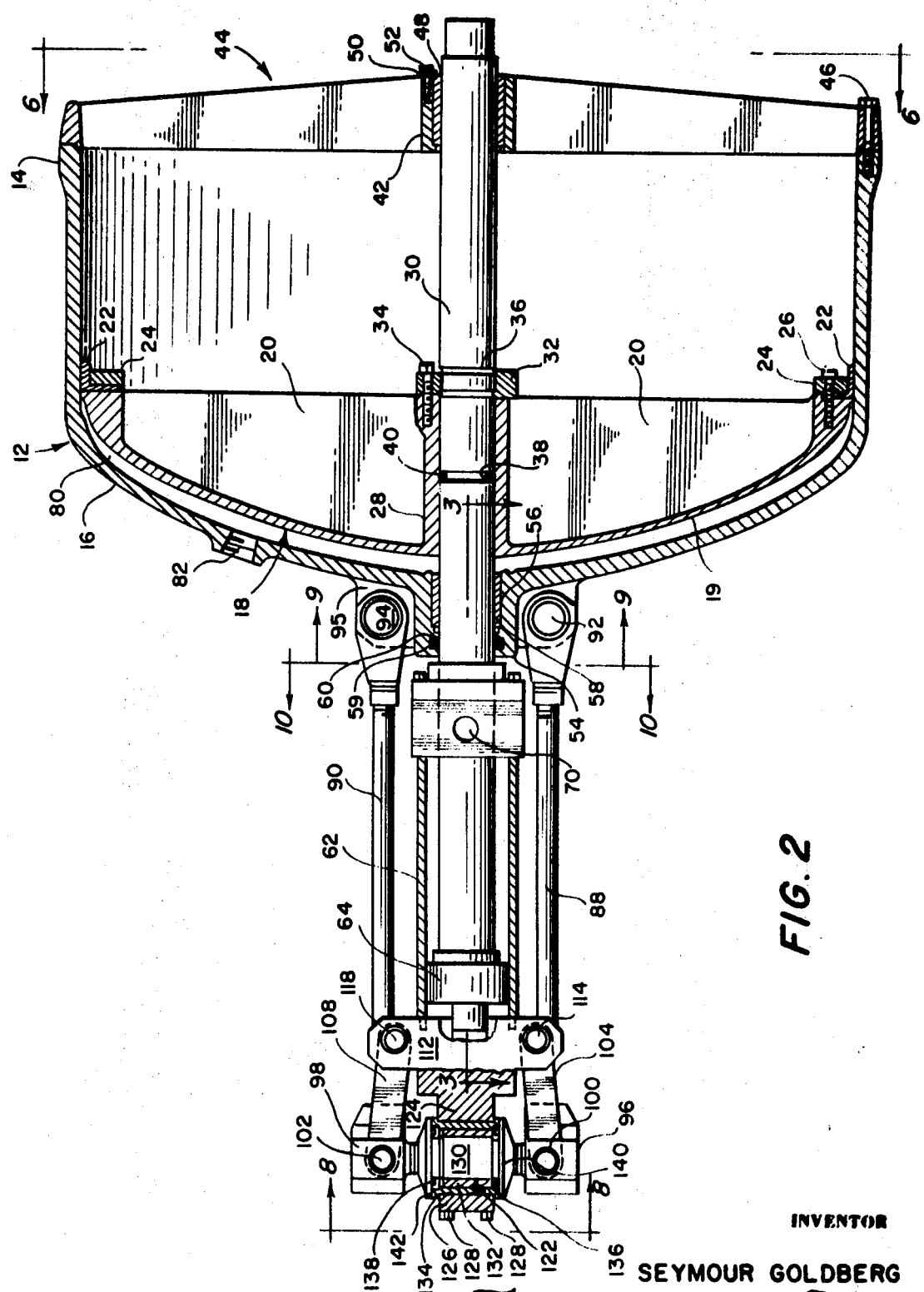
FIG. 2 is a horizontal section of the acoustic pulse generator in FIG. 1.

Referring first to FIGS. 1 and 2, the acoustic pulse generator, or Boomer, a trademark developed by EG&G, INC., to describe this type of generator, is comprised of a cylindrical main housing or cylinder, generally 12, having an open end 14 and a closed end 16.

The acoustic pulse generator further includes a slidable piston, generally 18, disposed within cylinder 12 to provide a chamber 80 of variable volume between the closed end 16 of cylinder 12 and the inner surface 19 of piston 18. As here embodied, closed end 16 of cylinder 12 is curved and the inner surface 19 of piston 18 is contoured to match the curve of closed end 16. As may be seen in FIGS. 2 and 6, the present embodiment of piston 18 includes a hollow cylindrical hub 28 and six ribs 20 radiating outwardly from hub 28 to the outer perimeter of piston 18 to add strength to the piston.

An annular cup seal 22 is mounted on the outer edge of piston 18 to provide sealing engagement with the inner wall of cylinder 12. Seal 22 is mounted by an annular clamp 24 held in place by a plurality of bolts 26 which extend through clamp 24, cup seal 22, and into appropriate internal threads in piston 18.

As here embodied, piston 18 is secured to a shaft 30 by means of a clamp 32 mounted on shaft 30 and secured to hub 28 by a plurality of bolts 34. Clamp 32 may be of any conventional type, such as a split type clamp which may be secured to shaft 30 at a groove 36 in the shaft with the internal diameter of the clamp being less than the outside diameter of the shaft 30 but greater than the diameter of groove 36.

The two halves of clamp 32 may then be bolted together or secured in any other conventional manner.

Shaft 30 has a second groove 38 positioned within hub 28 of piston 18. An O-ring seal 40 is inserted in groove 38 to provide a seal between the inner surface of shaft 30 and hub 28.

Figure 6:
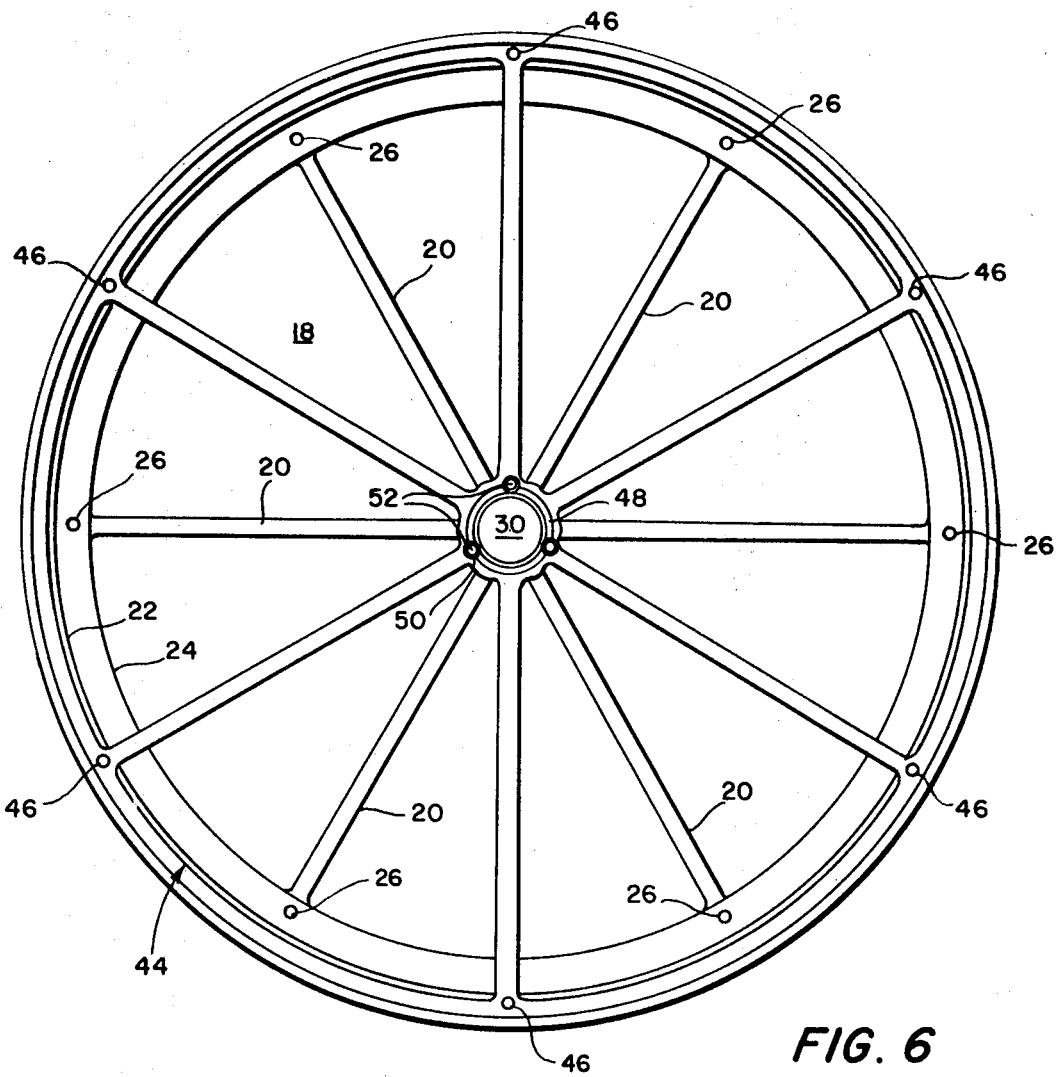
FIG. 6 is an end elevation taken along line 6—6 of FIG. 2.

As here embodied, and as best seen in FIGS. 2 and 6, shaft 30 is also slidably mounted in a hub 42 of a spider generally 44 mounted on the open end 14 of cylinder 12 by means of bolts 46 passing through the outer rim of spider 44 and into cylinder 12 where they are secured by suitable internal threads. A bushing 48 is mounted between hub 42 and shaft 30 by a plurality of washers 50 held in position by a plurality of bolts 52.

The other end of shaft 30 extends out through a neck 54 positioned on closed end 16 of cylinder 12. Neck 54 has an internal bore 56 in which is mounted a bushing 58 which permits shaft 30 to slide with respect to neck 54. A groove 59 and an O-ring seal 60 are provided in neck 54 to provide a seal between shaft 30 and neck 54.

In accordance with the invention, means are provided for displacing the piston and the closed end of the cylinder to an extended spaced position relative to each other.

Figure 3:
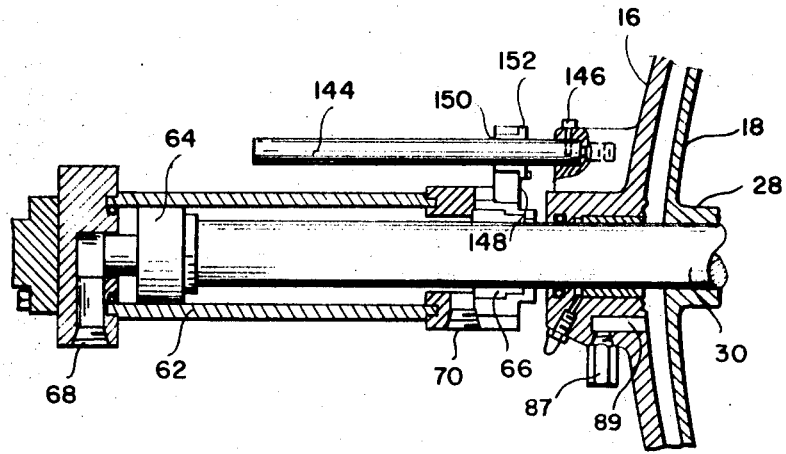
FIG. 3 is a fragmented horizontal section taken along lines 3—3 of the acoustic pulse generator of FIG. 2.

As here embodied, and as may be best seen in FIGS. 1-3, this displacing means comprises a hydraulic cylinder 62 having a piston, or plunger, 64 mounted on shaft 30. As may be best seen in FIG. 3, shaft 30 passes into one end of hydraulic cylinder 62 through a packing seal 66. A pair of ports 68 and 70 are provided in hydraulic cylinder 62. Ports 68 and 70 are connected through connectors 72 and 74 (FIG. 1), and hydraulic tubes 76 and 78 respectively to a source of hydraulic fluid (not shown).

As will be described in more detail hereinafter, hydraulic fluid is supplied from a hydraulic pump controlled by advance and retract solenoids. Thus, during the advance cycle hydraulic fluid may be introduced into port 68 through tube 76 and connector 72 to drive plunger 64 to the right thus extending piston 18 to the right to a position spaced from the closed end 16 of cylinder 12. At the same time, fluid between plunger 64 and port 70 will be driven out port 70 through connector 74 and tube 78 to the hydraulic pump. The chamber 80 which exists between the inside of closed end 16 of cylinder 12 and the inner surface 19 of piston 18 is thus enlarged. The fluid in hydraulic cylinder 62 acts on plunger 64 to hold piston 18 in the extended position relative to cylinder 12 until the generator is fired.

Figure 5:
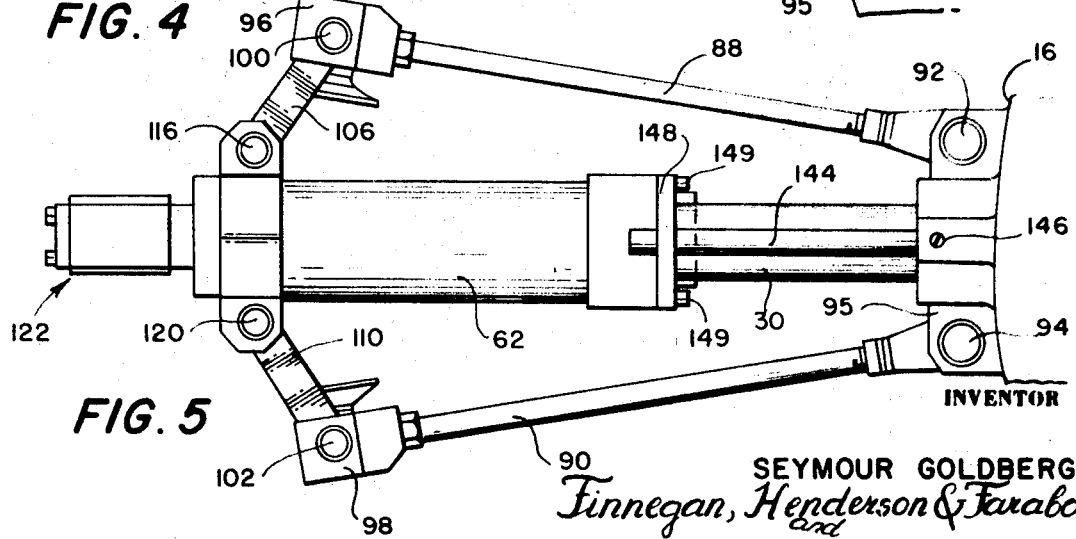
FIG. 5 is the same as FIG. 4 except that it illustrates the relative relationship of the parts of the pulse generator immediately after the generator has been fired.

At the start of the retract cycle, hydraulic cylinder 62 is in the position illustrated in FIG. 5. During the retract cycle, hydraulic fluid is introduced from the hydraulic pump into port 70 through tube 78 and connector 74 and hydraulic fluid is expelled through port 68, connector 72, and tube 76 to the hydraulic pump. There is no relative movement of cylinder 12 and piston 18 during the retract cycle and hence the pressure of the hydraulic fluid acting on plunger 64 and the right end of hydraulic cylinder 62 drives hydraulic cylinder 62 to the right until it returns to the position illustrated in FIG. 3.

In accordance with the invention, resilient means are provided in the chamber for preventing the piston from contacting the closed end of the cylinder when the piston is accelerated toward the closed end of the cylinder and for causing the piston or the cylinder to rebound to produce an acoustical pressure pulse in the fluid medium surrounding the cylinder.

As here embodied, the resilient means is comprised of a relatively compressible fluid such as a gas and is preferably air. The air is introduced into chamber 80 through a port 82 (FIG. 2) in the closed end of cylinder 12. A connector 84 (FIG. 1) secured to the end of an airhose 86 is threaded into port 82. Air line 86 is connected to a conventional vacuum regulator (not shown) for regulating the pressure of air in chamber 80. A connector 87 (FIG. 3) in communication with chamber 80 through a channel 89 is provided for use with a bleeder valve (not shown) to assist in the control of pressure in chamber 80.

In accordance with the invention, the acoustic pulse generator includes releasing means for releasing the piston and the cylinder from the extended position and permitting the pressure of the fluid medium in which the generator is submerged to drive the piston and the closed end of the cylinder toward each other.

Figure 4:
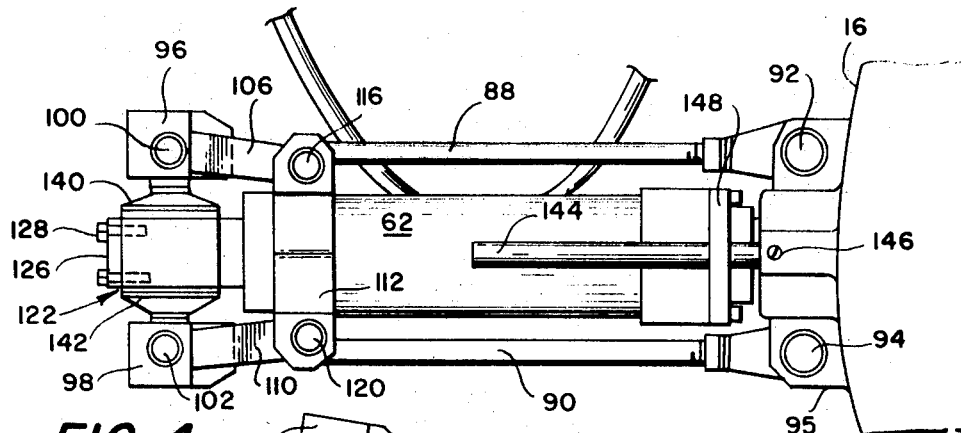
FIG. 4 is a fragmented bottom view of the pulse generator illustrated in FIG. 1.

As here embodied, and as may best be seen in FIGS. 2, 3, and 4, the releasing means is comprised of a releasable mounting for hydraulic cylinder 62 and includes a pair of pivot links 88 and 90 mounted on opposite sides of hydraulic cylinder 62. Pivot links 88 and 90 are pivotally secured at one end to cylinder 12 through trunnion bearings 92 and 94 which are mounted in a trunnion block 95. Trunnion block 95 is secured to cylinder 12 by welding or other conventional means. The other end of pivot links 88 and 90 are connected to magnetic pivot blocks 96 and 98 respectively.

Figure 7:
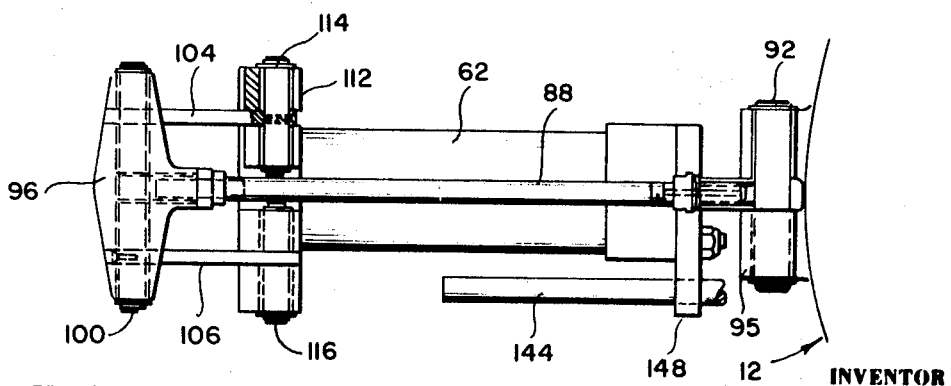
FIG. 7 is a fragmented side elevation, partially in section, of the pulse generator in FIG. 1.
Figure 8:
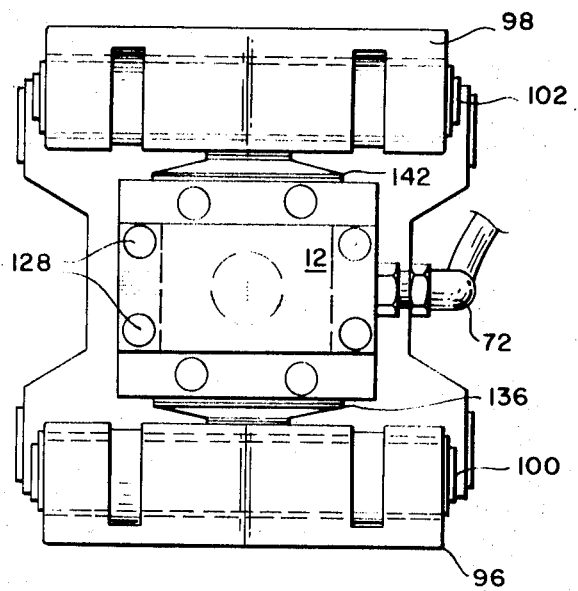
FIG. 8 is an enlarged end elevation taken along line 8—8 in FIG. 2.
Figure 10:
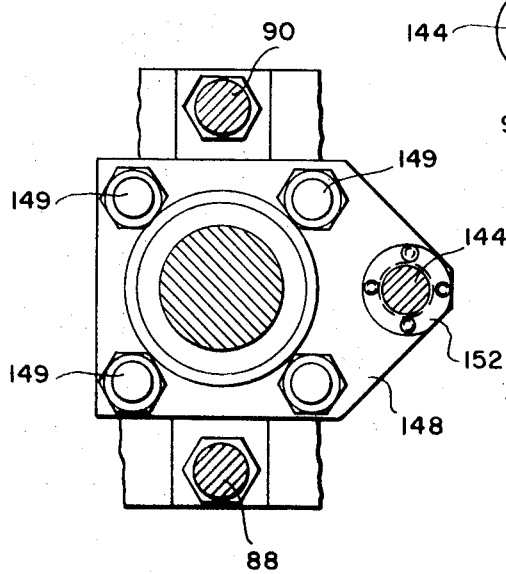
FIG. 10 is an enlarged fragmented vertical section taken along line 10—10 in FIG. 2.

Pivot blocks 96 and 98 contain trunnion bearings 100 and 102, respectively. As may be best seen in FIG. 7, a pair of short pivot links 104 and 106 are connected to trunnion bearing 100. Similarly a pair of short pivot links 108 and 110 are connected to trunnion bearing 102. Thus, short pivot links 104 and 106 may pivot with respect to magnetic pivot block 96 and short pivot links 108 and 110 may pivot with respect to magnetic pivot block 98.

Another trunnion block 112 is secured to hydraulic cylinder 62 by suitable means such as by bolts, welding or the like. Trunnion block 112 has four trunnion bearings 104, 106, 108, and 110 to which are connected short pivot links 104, 106, 108, and 110, respectively. Thus, the short pivot links may pivot with respect to trunnion block 112 and with respect to magnetic pivot blocks 96 and 98.

As may be seen in FIG. 4, short links 114, 116, 118, and 120 are aligned at a slight angle to the long links 88 and 90. Forces exerted on either the long links or on the hydraulic cylinder 62 which have a force component acting parallel to the axis of the long links will tend to pivot both the long and the short links with respect to the hydraulic cylinder.

In accordance with the invention, the releasing means also includes latch means for holding the main cylinder and the hydraulic cylinder in one position relative to each other. As here embodied, the latch means is comprised of an electromagnet acting on one end of at least one of the long links of the releasing means to prevent the long links from pivoting.

As may be seen in FIG. 2, electromagnet, generally 122, is mounted in a mounting block 124 which is secured to the outer surface of trunnion block 112 by welding or other conventional securing means. Magnet 122 is held in position by a clamp 126 which is secured to mounting block 124 by bolts 128.

Magnet 122 includes a cylindrical core 130 and annular cylindrical windings 132 wrapped around the circumference of the core. A protective cover 134 extends around the exterior of windings 132. Core 130 and cover 134 both are constructed of ferromagnetic material and both become magnetized when windings 132 are energized. Protective annular inserts 136 and 138 are mounted in the grooves formed on the ends of the magnet between core 130, windings 132, and cover 134. Inserts 136 and 138 are not of ferromagnetic material and therefore can not shunt out the magnetic field.

Magnet poles 140 and 142 which are of ferromagnetic material are mounted on pivot blocks 96 and 98, respectively, and cooperate with the ends or face of electromagnet 122 to hold pivot links 88 and 90 in position, as will be explained in more detail hereinafter.

In accordance with the invention, guide means are provided which are connected to the hydraulic cylinder and to the main cylinder for guiding the relative movement of the hydraulic cylinder and the main cylinder.

As here embodied, and as best seen in FIGS. 3–5, and 7, the guide means includes a shaft 144 mounted on trunnion block 95 at the closed end 16 of main cylinder 12.

Shaft 144 may be secured to trunnion block 95 in any conventional manner. As here illustrated, the end of shaft 144 is threaded and block 95 contains internal threads to permit shaft 144 to be threaded into block 95. A setscrew 146 holds shaft 144 in proper position.

The guide means also includes a bracket 148 mounted by bolts 149 or other conventional means on the end of cylinder 62. Bracket 148 has an opening 150 aligned with shaft 144 to permit shaft 144 to pass therethrough. A bushing 152 is mounted in opening 150 to permit shaft 144 to slide smoothly.

Figure 9:
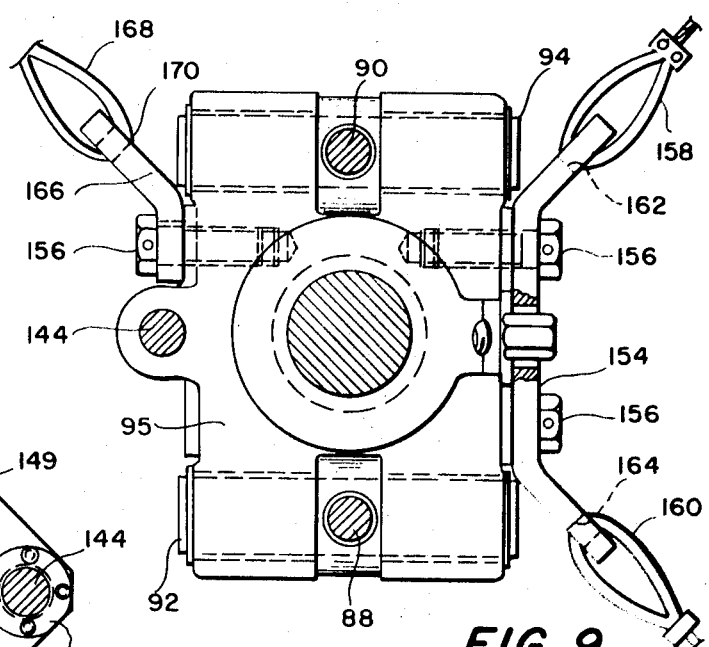
FIG. 9 is an enlarged vertical section taken along line 9—9 in FIG. 2 and includes brackets and cables not shown in FIG. 2.

As may be seen in FIG. 9, suitable connections may be provided for towing the acoustic pulse generator through the water or other fluid medium. As here illustrated, a double bracket 154 is bolted to trunnion block 95 by bolts 156, and cables 158 and 160 are connected through openings 162 and 164, respectively, to bracket 154.

A single bracket 166 is mounted on the other side of trunnion block 95 by bolt 156. A cable 168 is connected through an opening 170 to bracket 166. Additional brackets and cables may be used if desired.

Figure 11:
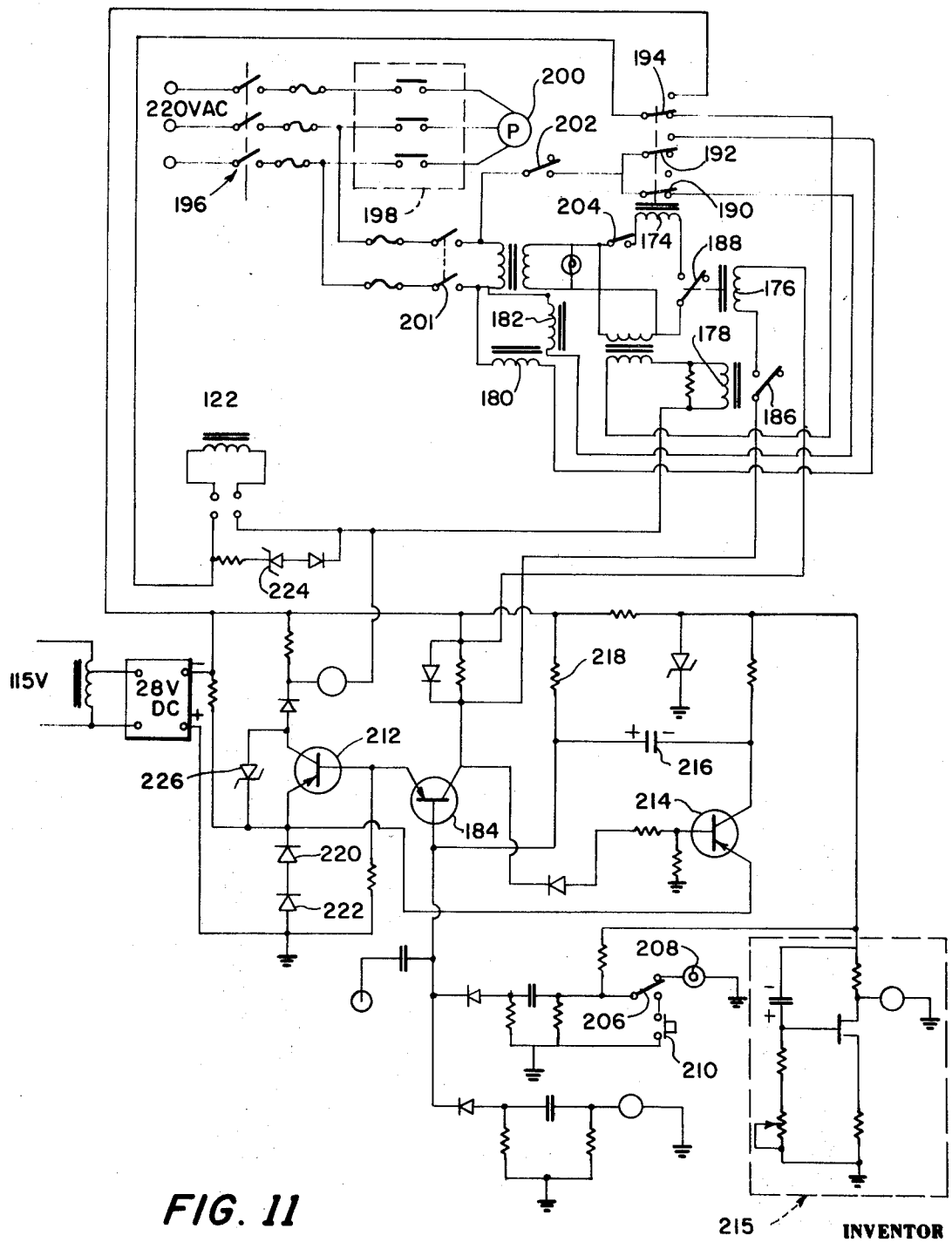
FIG. 11 is a schematic circuit diagram illustrating one embodiment of the control circuit of this invention.

In accordance with the invention, the releasing means also includes a control circuit. The present embodiment of the control circuit is illustrated in FIG. 11. As will be apparent to those skilled in the art, appropriate values may be assigned to the various elements of the circuit.

A switch 196 controls the application of 220 volt AC power to the control circuit and to a motor starter 198 for a hydraulic pump 200. Pump 200 includes a control valve connected to tubes 76 and 78 (FIG. 1) and operated by solenoids 180 and 182.

Switch 201 controls application of 220 volt AC power to the control circuit. Switch 202 controls application of 220 volt AC power to solenoids 180 and 182 through contacts 190 and 192 of relay 174. In the open position of switch 202, power is removed and all ports of the solenoid valves are closed. In the closed position, the circuits of the solenoid valves are activated.

Switch 204 controls application of AC power to the coil of relay 174. When switch 204 is in the open position, power to the coil of relay 174 is interrupted and contact 190 stays in the closed position; contact 192 stays in the open position; and contact 194 stays in contact with the sense circuit.

Switches 196, 201, 202, and 204 must all be closed for automatic operation of the system.

Switch 206 connects a trigger circuit with either an external switch shown schematically as 208, or an internal pushbutton switch 210 for firing the generator.

The control circuit includes three relays 174, 176, and 178. Relay 174 switches power between an advance solenoid 180 of the hydraulic control valve and the retract solenoid 182 of the hydraulic control valve. Relay 174 also switches the electromagnet 122 from the sensing circuitry to the DC power circuitry.

Relay 176 controls the application of power to the coil of relay 174. Power to the coil of relay 176 is controlled by a transistor 184 and relay 178.

Relay 178 senses the presence of magnet poles 140 and 142 at the faces of magnet 122 and controls application of power to relay 176 as described above.

In accordance with the invention, the control means includes a sensing circuit for sensing the presence of ends of the long pivot links adjacent the electromagnet and for activating the electromagnet when this presence is sensed.

As here embodied, the sensing circuit operates as follows: during the retract cycle the coil of relay 178 is connected in series with electromagnet 122 and AC voltage is applied to this combination. When the magnet poles 140 and 142 are separated from the electromagnet 122, the impedance of the coil of the electromagnet drops to a low value so that relay 178 is actuated and contact 186 is opened. A resistor connected across relay 178 adjusts the sensitivity of the relay coil to changes in magnet impedance. The opening of contact 186 interrupts power to relay 176 which permits contact 188 to move to its normally open position. The opening of contact 188 in turn interrupts the power to relay 174 allowing contact 190 to move to its normally closed position actuating retract solenoid 182; allowing contact 192 to move to its normally open position deactivating advance solenoid 180; and allowing contact 194 to move to its normal position in contact with the sense circuit.

When magnet poles 140 and 142 return to a position adjacent electromagnet 122, which signifies the end of the retract cycle, the impedance of the coil of electromagnet 122 jumps to a high value, relay 178 is deactivated, and contact 186 returns to its normally closed position. If transistor 184 is on, this allows power to be applied to relay 176 causing its contact 188 to close which applies power to relay 174 which opens contact 190 interrupting power to retract solenoid 182; closes contact 192 which applies power to advance solenoid 180; and moves contact 194 to the DC power circuit. The end of the retract cycle and the start of the advance cycle are thus automatically initiated by the sensing of the position of magnet poles 140 and 142.

The magnet power circuit and the trigger circuits will next be described. Magnet power is supplied by a 28 volt DC power supply which can be varied between 0 and full voltage. This power supply also provides the DC voltage for the sensing and trigger circuitry. At less than about 14 volts relay 176 cannot be activated, so this represents the lowest useful voltage for the unit.

Power is applied to magnet 122 through a transistor 212 and contact 194 of relay 174. Transistor 212 is normally turned on full when being base driven by a transistor 184 which is also normally fully conducting. A third transistor 214 is normally off.

Interruption of magnet current is initiated by applying a positive pulse to the base of transistor 184. This is accomplished by the closure of external switch 208 or internal pushbutton switch 210 depending on the position of switch 206, or it may be accomplished by a trigger input if desired. This internal positive trigger input can be supplied by an internal unijunction relaxation oscillator 215.

Driving the base of transistor 184 positive, momentarily turns the transistor off. This interrupts the drive to transistor 212 and turns it off. The circuit of transistor 214 keeps the drive off long enough to assure release of magnet poles 140 and 142 from electromagnet 122.

When transistor 184 is momentarily turned off, it triggers transistor 214 into conduction by the negative voltage change fed from the collector of transistor 184 to the base of transistor 214. The base drive for transistor 184 is thus diverted through a capacitor 216 to the collector of transistor 214 which is now turned on. When this capacitor becomes charged to a preselected level, current will again start flowing through a resistor 218 to the base of transistor 184 turning this transistor on again.

The positive swing of the collector of transistor 184 will turn transistor 214 off again. The off time of transistor 184 is controlled by resistor 218 and capacitor 216. Two diodes 220 and 222 in the emitter to ground leg of transistor 212 provide bias to aid in the turn off.

When the magnet current attempts to interrupt, the stored energy in the magnetic field is dissipated by a Zener diode 224 and a Zener diode 226 which protects transistor 212 from excessive collector voltage. These diodes control the actual rate of decay-current in the electromagnet.

When the unit is triggered and current through transistor 184 is interrupted, power is also interrupted through the coil of relay 176 causing its contact to open which interrupts the current through relay 174 and switches its contacts to the retract solenoid position and the sense position. Thus, firing the generator also starts the retract cycle.

Magnet poles 140 and 142 separate from electromagnet 122 when the generator is fired and sufficient voltage appears across the coil of relay 178 to cause its contact to open. Thus, power is kept off the coil of relay 176 until magnet poles 140 and 142 are returned to a position adjacent electromagnet 122. The increase in electromagnet coil impedance, then causes relay 178 to return contact 186 to its closed position which in turn allows power to be applied to the coil of relay 176 (by this time, transistor 184 is turned on). With relay 176 turned on, relay 174 is activated, causing the solenoids to switch from retract to advance and the magnet to switch from the sense mode to the DC power mode. Thus, when magnet poles 140 and 142 are positioned adjacent the faces of electromagnet 122, the advance cycle is automatically started.

The acoustic pulse generator is operated in the following manner. First, the generator is submerged in water by means of cables 158, 160, and 162, and is drawn along in the water by a boat or the like.

For purposes of discussion, we will start the cycle of operation at a time just after an output pulse. At this time, the piston is in the collapsed position, illustrated in FIGS. 2 and 3, and the control links are in an unfolded position as shown in FIG. 5.

The retract solenoid valve 182 of the hydraulic pump control would have been energized at the same instant the output pulse, or shot occurred. However, insignificant motion occurs in the retract direction during the short duration of the shot. Thus, immediately after the shot, hydraulic fluid is already starting to enter through port 70 (FIG. 3) to urge cylinder 62 to the retract position which is to the right in the illustration until hydraulic cylinder 62 is adjacent main cylinder 12. This movement of hydraulic cylinder 62 causes pivot links 88 and 90 and short pivot links 104, 106, 108, and 110 to fold together bringing magnet poles 140 and 142 adjacent to the faces of electromagnet 122.

FIGS. 1, 2, 3, and 4 show the position of hydraulic cylinder 62, and the relative position of electromagnet 122 and magnet poles 140 and 142 at the end of the retract cycle. The volume of chamber 80 is still collapsed at this time.

As described above, when magnet poles 140 and 142 contact electromagnet 122, the increase in impedance of the electromagnet coil deactivates relay 178 causing the contact 186 to return to its normally closed position. With contact 186 in the closed position, power is applied to relay 176 which switches contact 188 to the closed position actuating relay 174.

Relay 174 then switches contact 194 from the sense to the magnet position, which applies DC power to electromagnet 122 causing electromagnet 122 to latch poles 140 and 142 in position adjacent the magnet. This signifies the end of the retract cycle.

Relay 174 also switches contacts 190 and 192 from the retract position to the advance position in which power is applied to the advance solenoid of the hydraulic control valve. This permits pump 200 to force hydraulic fluid into port 68 of hydraulic cylinder 62 and permits the fluid in hydraulic cylinder 62 to be returned to the pump through port 70.

Thus, the end of the retract cycle and the start of the advance cycle occur automatically when the control circuit senses the positioning of the magnet poles 140 and 142 adjacent electromagnet 122.

The activation of electromagnet 122 holds poles 140 and 142 against the end faces of electromagnet 122 and holds pivot links 88 and 90 and short pivot links 104, 106, 108, and 110 in the folded position illustrated in FIG. 4. With the pivot links held in the folded position, hydraulic cylinder 62 is also held in the retract position as illustrated in FIG. 4.

As hydraulic fluid is forced into port 68, hydraulic plunger 64 is driven toward the right end of hydraulic cylinder 62. The movement of hydraulic plunger 62 is transmitted to shaft 30 and piston 18 causing piston 18 to be extended. This extension increases the volume of chamber 80 and creates a partial vacuum in this chamber. The degree of vacuum is regulated by a vacuum regulator located at the water surface and operated through airhose 86, connector 84, and port 82 which is in communication with chamber 80. It is presently preferred that the initial vacuum pressure in chamber 80 be between 0.1 and 0.3 of the ambient water pressure depending on the bore of cylinder 12 and the stroke length of piston 18.

During the advance stroke or extension of piston 18, hydraulic cylinder 62 is held in place relative to main cylinder 12 by electromagnet 122 as described above.

At the end of the advance stroke a pressure compensating device in hydraulic pump 200 stops the flow of fluid to the advance port 68 but pressure is maintained on the fluid to hold piston 18 in the extended position. The acoustic pulse generator is now cocked and ready to fire.

Firing is accomplished by closing either external switch 208 or internal switch 210 or by oscillator 215. This interrupts the current to the electromagnet 122, releases magnet poles 140 and 142 from the electromagnet, and permits long pivot links 88 and 90 and short pivot links 104, 106, 108, and 110 to unfold. With the pivot links released to unfold, the external ambient force of the water pressure acting on piston 18 accelerates piston 18 toward the closed end 16 of cylinder 12.

As piston 18 moves toward the closed end 16 of cylinder 12, it compresses the air in chamber 80. At one point in the travel of piston 18, the internal pressure in chamber 80 will equal the external ambient pressure of the water acting on the outside of piston 18. However, piston 18 will continue to move toward closed end 16 of cylinder 12 due to the inertia of piston 18. The inertia of piston 18 is overcome, by the buildup of pressure in chamber 80, in the further travel of the piston toward closed end 16. Thus, the pressure of the compressed air prevents piston 18 from striking closed end 16.

At the end of the stroke of piston 18, the internal air pressure in chamber 80 reaches quite high values of the order of several hundred p.s.i. causing piston 18 to rebound against the external water pressure acting on the outside of piston 18. This rebound causes a large positive acoustic pressure pulse to be generated. The rarefaction or negative pressure wave generated during the initial acceleration is quite small in amplitude, compared to the positive pressure pulse generated during the rebound. The preferred initial vacuum pressure in chamber 80, of between about 0.1 to 0.3 of the ambient water pressure, maximizes the positive acoustic pulse generated during the rebound period.

Piston 18 then oscillates briefly before coming to rest near the end of its stroke as shown in FIGS. 2 and 3. This is the end of one cycle of the acoustic pulse generator and the generator is now ready for the retract cycle to start.

It is to be understood as pointed out previously that the description of the operation of the generator presumes that the mass of cylinder 12 and the effective water load mass coupled to the cylinder are high so that cylinder 12 is stationary with respect to piston 18. This is the condition which was designated Mode 2.

In Mode 3, where the mass of piston 18 and the effective water load mass coupled to the piston are high so that piston 18 is stationary with respect to the cylinder 12, hydraulic cylinder 62 will be moved to the left when the advance solenoid is actuated and hydraulic fluid is forced into port 68. Since hydraulic cylinder 62 is fixed in position relative to main cylinder 12 by the pivot links, main cylinder 12 will also be displaced to the left bringing piston 18 and the closed end 16 of cylinder 12 to the extended position spaced from each other.

Similarly, when the generator is fired, the closed end 16 of cylinder 12 will be accelerated toward piston 18 by ambient pressure of the water and the air in chamber 80 will cause cylinder 12 to rebound away from piston 18 to produce the acoustical pressure pulse in the water.

In Mode 1, where the cylinder and piston with their effective water load masses are equal in mass both cylinder 12 and piston 18 will move when they are being brought to the extended position spaced from each other. Further, both cylinder 12 and piston 18 will move when they are being accelerated toward each other and both will rebound to produce the acoustical pressure pulse in the water.

In marine underwater seismic exploration, it is desirable to have a sequence of acoustical signals which will be reflected by the formation being explored and can be monitored by appropriate seismic equipment at the water surface. Thus, when the acoustic pulse generator is submerged and is being drawn along a predetermined path overlaying the formations to be explored, it is repeatedly fired to produce a sequence of acoustical pulses which are then reflected to the monitoring equipment by the formation.

From the foregoing description, it is apparent that the present invention provides a new and improved marine seismic exploration system which produces pulses of relatively long duration and low frequency.

The invention in its broader aspects is not limited to the specific mechanism and process shown and described, but also includes within its scope any departures made from such mechanism and process that do not depart from the principles of the invention and do not sacrifice its chief advantages.

What is claimed is:

1. An acoustic pulse generator for creating acoustic pulses when submerged in a fluid medium comprising:
   a. a cylinder having one end closed and one end opened to the fluid medium;
   b. a piston slidably disposed within and in sealing engagement with said cylinder to provide a chamber of variable volume between the closed end of said cylinder and said piston;
   c. means for displacing said piston and the closed end of said cylinder to an extended spaced position relative to each other; and
   d. resilient means in the chamber, for preventing said piston from contacting the closed end of said cylinder when said piston or the closed end of said cylinder or both, are accelerated inwardly with respect to the chamber, by the ambient pressure of the fluid medium and for causing said piston or said cylinder or both to rebound outwardly with respect to said chamber to produce an acoustical pressure pulse in the fluid medium surrounding said cylinder.

2. The acoustic pulse generator of claim 1 wherein the combined mass of said cylinder and the effective water load mass coupled to said cylinder is high with respect to the combined mass of said piston and the effective water load mass coupled to said piston; said cylinder is relatively stationary with respect to said piston; said piston moves to the extended position spaced from the closed end of said cylinder; said piston is accelerated inwardly with respect to the chamber; and said piston rebounds outwardly to produce the acoustical pressure pulse.

3. The acoustic pulse generator of claim 1 wherein the combined mass of said piston and the effective water load mass coupled to said piston is high with respect to the combined mass of said cylinder and the effective water load mass coupled to said piston; said piston is relatively stationary with respect to said cylinder; the closed end of said cylinder moves to the extended position spaced from said piston, the closed end of said cylinder is accelerated inwardly with respect to the chamber; and said cylinder rebounds outwardly to produce the acoustical pressure.

4. The acoustic pulse generator of claim 1 wherein the combined mass of said cylinder and the effective water load mass coupled to said cylinder and the combined mass of said piston and the effective water load mass coupled to said cylinder are substantially equal; both the closed end of said cylinder and said piston move when they are being displaced to the extended spaced position relative to each other; both said piston and the closed end of said cylinder, move when they are accelerated inwardly; and both said piston and said cylinder rebound outwardly to produce the acoustical pressure pulse.

5. The acoustic pulse generator of claim 1 wherein said resilient means is a compressible fluid.

6. The acoustic pulse generator of claim 5 including holding means for holding said piston and said cylinder in the extended position against the pressure of the fluid medium, and releasing means for releasing said piston and said cylinder from the extended position to permit the pressure of the fluid medium to drive said piston or said cylinder or both inwardly with respect to the chamber.

7. The acoustic pulse generator of claim 6 wherein said displacing means and said holding means are comprised of a hydraulic cylinder having a plunger connected to said piston.

8. The acoustic pulse generator of claim 6 including vacuum regulating means for controlling the pressure of the compressible fluid within the chamber.

9. The acoustic pulse generator of claim 7, wherein said releasing means is comprised of:
   a. at least one link pivotally connected to the outer surface of said cylinder and pivotally connected to the outer surface of said hydraulic cylinder;
   b. latch means connected to said link for holding said cylinder and said hydraulic cylinder in one position relative to each other;
   c. control means for releasing said latch means to permit said link to pivot with respect to said cylinder and said hydraulic cylinder causing said cylinder and said hydraulic cylinder to move relative to one another, whereby the pressure of the fluid medium may accelerate said piston or the closed end of said cylinder or both inwardly with respect to the chamber, and said hydraulic cylinder may move longitudinally with respect to said cylinder.

10. The acoustic pulse generator of claim 9 wherein said latch means is comprised of an electromagnet and said control means includes an electric circuit which can be deactivated when it is desired to fire the generator.

11. The acoustic pulse generator of claim 9 including a second link which is pivotally connected to said hydraulic cylinder, and wherein said first link includes a first end which is pivotally connected to said cylinder, and a second end which is pivotally connected to said second link, said second link being aligned at a slight angle to said first link whereby forces, exerted on either said first link or on said hydraulic cylinder, which have a force component parallel to the axis of said first link will tend to pivot said first link and said second link with respect to said hydraulic cylinder.

12. The acoustic pulse generator of claim 11 wherein said latch means is comprised of an electromagnet which attracts one end of said first link of said releasing means to prevent said first link and said second link from pivoting.

13. The acoustic pulse generator of claim 12 wherein said control means includes sensing means for sensing the presence of the second end of said first link adjacent said electromagnet and for actuating said electromagnet when the presence of said link is sensed.

14. The acoustic pulse generator of claim 9 including guide means connected to said hydraulic cylinder and to said cylinder for guiding the relative movement of said hydraulic cylinder and said cylinder.

15. The acoustic pulse generator of claim 9 including a spider mounted at the open end of said cylinder, and a shaft secured to said piston and concentrically mounted in said spider to support and guide said piston during relative movement of said piston and said cylinder.

16. An acoustic pulse generator for creating acoustic pulses when submerged in a fluid medium comprising:
   a. a cylinder having one end closed and one end opened to the fluid medium;
   b. a piston slidably disposed within and in sealing engagement with said cylinder to provide a chamber of variable volume between the closed end of said cylinder and said piston;
   c. means for displacing said piston to an extended position spaced from the closed end of said cylinder;
   d. holding means for holding said piston in the extended position against the pressure of the fluid medium;
   e. releasing means for releasing the piston from the extended position to permit the pressure of the fluid medium to drive said piston inwardly with respect to the chamber; and
   f. resilient means in the chamber for preventing said piston from contacting the closed end of said cylinder when said piston is accelerated inwardly with respect to the chamber by the ambient pressure of the fluid medium and for causing said piston to rebound outwardly with respect to the chamber to produce an acoustic pressure pulse in the fluid medium surrounding the cylinder.

17. The acoustic pulse generator of claim 16 wherein said resilient means is a gas and the generator includes vacuum regulating means for controlling the pressure of the gas within the chamber.

18. An acoustic pulse generator for creating acoustic pulses when submerged in a fluid medium comprising:
   a. a cylinder having one end closed and one end opened to the fluid medium;
   b. a piston slidably disposed within and in sealing engagement with said cylinder to provide a chamber of variable volume between the closed end of said cylinder and said piston;
   c. a hydraulic cylinder connected to said cylinder and said piston for displacing said piston to an extended spaced position relative to the closed end of said cylinder and for holding said piston in the extended position;
   d. a gas in the chamber for preventing the piston from contacting the closed end of the cylinder when the piston is accelerated inwardly with respect to the chamber by the ambient pressure of the fluid medium, and for causing the piston to rebound outwardly with respect to the chamber to produce an acoustical pressure pulse in the fluid medium surrounding said cylinder and
   e. vacuum regulating means for controlling the pressure of the gas within the chamber.

19. In a method for marine seismic exploration, the steps of:
   a. submerging, in a body of water, a cylinder having an open end and a closed end with a piston disposed between the ends;
   b. drawing the cylinder along a predetermined path overlaying the object to be explored;
   c. periodically establishing a predetermined volume of gas, at a pressure below the ambient pressure of the water, adjacent the closed end of the cylinder;
   d. permitting the ambient water pressure to accelerate the piston inwardly toward the gas to compress the gas adjacent the closed end of the cylinder, the volume of gas being sufficient to prevent the piston from striking the closed end of the cylinder;
   e. permitting the compressed gas to cause the piston to rebound against the ambient pressure of the water to produce a large acoustic pressure pulse; and
   f. monitoring the sequence of acoustical signals reflected from the object.

20. The method of claim 19 including the steps of holding the piston and the closed end of the cylinder at an extended position relative to each other while establishing the predetermined volume of gas adjacent the closed end of the cylinder; and when desiring to produce an acoustic pulse, releasing the piston and the cylinder from their extended position to permit the ambient water pressure to accelerate the piston toward the closed end of the cylinder.

21. An acoustic pulse generator for creating acoustic pulses when submerged in a fluid medium comprising:
   an expandable and collapsible structure for establishing a chamber or variable volume in the fluid medium;
   means connected to said structure for displacing said structure to an expanded position to expand the chamber against the ambient pressure of the fluid medium; and
   resilient means in the chamber for preventing the chamber from complete collapse when said structure is collapsed by the ambient pressure of the fluid medium and for causing said structure to rebound outwardly with respect to the chamber to produce an acoustical pressure pulse in the fluid medium surrounding said structure.

22. The acoustic pulse generator of claim 21, wherein said resilient means is a compressible fluid.

23. The acoustic pulse generator of claim 22 wherein said compressible fluid comprises a gas located in the chamber, the pressure of said gas being reduced to a vacuum pressure less than the ambient pressure of the fluid medium when said structure is expanded.

24. The acoustic pulse generator of claim 23, including vacuum regulating means for controlling the pressure of the gas within the chamber.

25. The acoustic pulse generator of claim 21 including holding means for holding said structure in the expanded position against the pressure of the fluid medium, and releasing means for releasing said structure from the expanded position to permit the pressure of the fluid medium to collapse the chamber established by said structure.

26. A method of producing an acoustic pulse in a fluid medium, comprising:
  establishing a chamber of variable volume in the fluid medium containing a compressible fluid;
  expanding the chamber against the ambient pressure of the fluid medium to reduce the pressure of the compressible fluid to a vacuum pressure below the ambient pressure of the fluid medium;
  permitting the ambient pressure of the fluid medium to collapse the chamber to compress the compressible fluid in the chamber, the volume of compressible fluid being sufficient to prevent the chamber from complete collapse; and
  permitting the compressible fluid to cause the chamber to rebound against the ambient pressure of the fluid medium to produce an acoustic pulse in the fluid medium.

27. The method of claim 26, which includes:
  regulating the pressure of the compressible fluid in the chamber.